March 24, 1964  F. ABELL  3,125,936
MOVABLE MASK FOR A CAMERA
Filed May 2, 1960
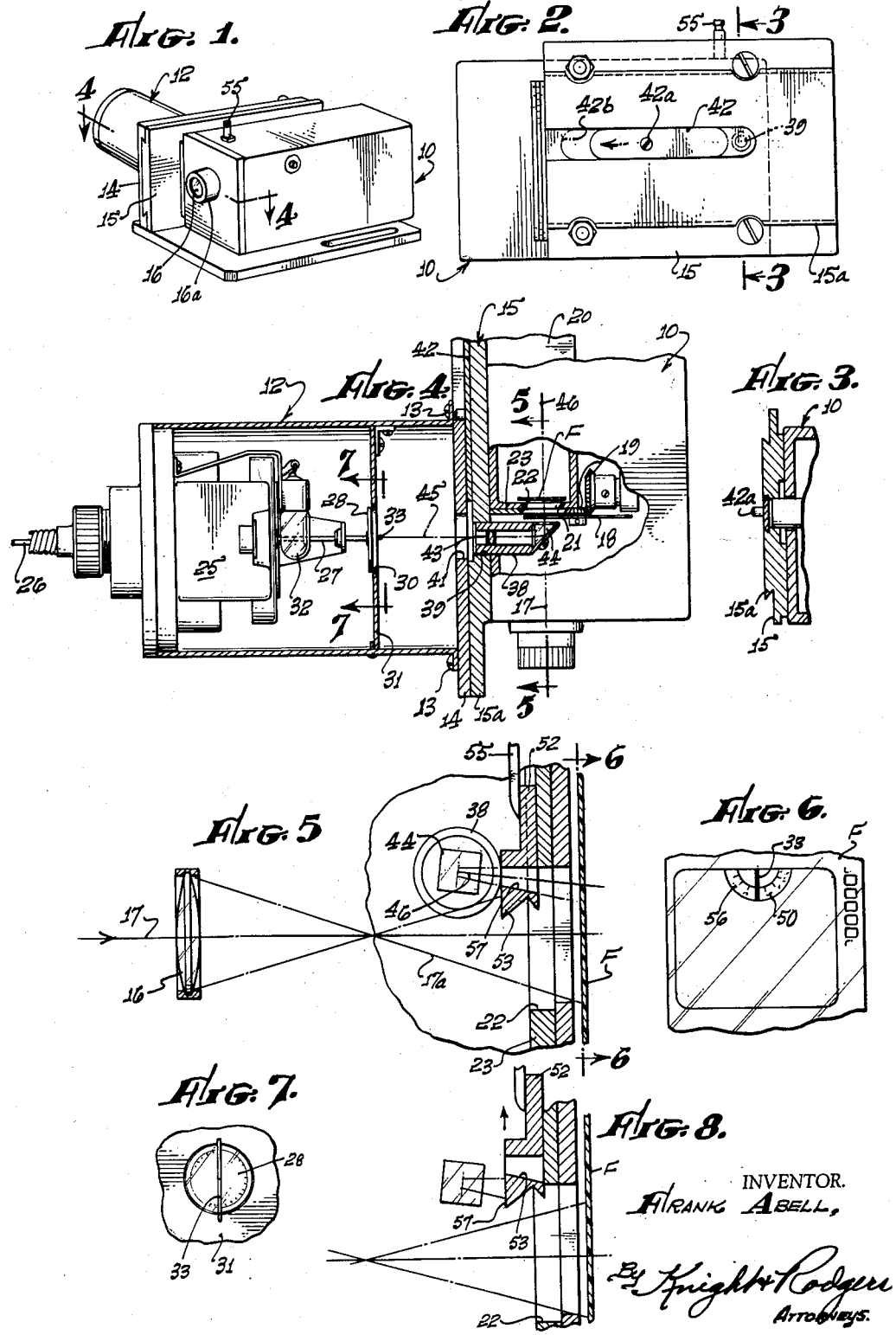
INVENTOR.
FRANK ABELL,
By Knight+Rodgers
ATTORNEYS.

United States Patent Office 3,125,936
Patented Mar. 24, 1964

3,125,936
MOVABLE MASK FOR A CAMERA
Frank Abell, 631 Augusta St., Inglewood, Calif.
Filed May 2, 1960, Ser. No. 26,369
9 Claims. (Cl. 95—1.1)

The present invention relates generally to cameras; but is more especially concerned with masking means for use in a camera wherein light from two separate sources is projected onto the film simultaneously in order to produce a composite picture from two separate images. This application is a continuation-in-part of my earlier application Serial No. 706,959 filed January 3, 1958 for "Movable Mask For A Camera," now abandoned.

This type of camera construction can be distinguished from one in which the images are overlapped or superimposed one upon another to produce a composite picture since in the present instance a portion of the field is masked from the one image in order to allow only the other image to be printed upon that masked portion of the field.

A particular application of this construction is a camera that is used for recording traffic violations. The camera commonly used for this purpose is a motion picture camera of conventional design. It may take a series of exposures in the usual way or it may operate to expose only a single frame when the operating mechanism is actuated.

Through the ordinary lens system, the major portion of the exposed area of film has projected onto it the scene of the traffic violation, including the vehicle committing the violation. Assuming that the violation is one involving excessive speed, it is desired to record simultaneously upon this same film an image of a speedometer indicating the speed at which the vehicle carrying the camera was traveling. This is accomplished by means of a second lens system which projects onto a minor portion of the film an image of the speedometer.

Thus it becomes a general object of my invention to provide a camera of this character with a suitable optical system, including a mask, which permits the projection of the image of the speedometer upon the film at the same time that the image of the scene of the traffic violation is projected onto the film.

A major object of my invention is to provide a camera that can be used as an ordinary motion picture camera as well as a traffic camera. Motion picture cameras represent a sizable investment. Most police departments and large transportation companies have one to record various data; and by adapting this general purpose camera to serve also as a speed recording camera the single instrument becomes a dual purpose camera and the total investment is greatly reduced. Yet each function can be performed without interfering with the other by the movement of one sliding member. Heretofore traffic cameras for recording speed when used outside the automobile had the area reserved for the speedometer blocked to images coming through the main lens.

It is also an object of my invention to provide a camera of this general character in which the mask is adapted to provide a camera of this general character in which the mask may be adapted to provide a narrow border around the image of the speedometer, thus separating the two images that appear on the final picture.

Another object is to locate the masking means where dirt and lint are less liable to collect. Traffic cameras have heretofore had the speedometer image placed in the sky section because the speedometer image, being relatively large, when located in the sky section of the picture does not interfere with the image of other objects being photographed. This means that the prism and mask are located at the bottom of the opening in the camera wall immediately ahead of the film and at a position where dirt and lint can collect. Accumulation of dust and lint is more severe in motion picture cameras than in still cameras because of the greater volume of film handled. This necessitates frequent cleaning. By reducing the size of the speedometer image, which is facilitated by the prism being placed outside of the optical path of the main lens, the secondary image can be placed in the ground section of the picture without too much objection. Then the prism and mask can be located at the top of the camera opening adjacent the film in a position where dirt and lint do not collect ordinarily.

A further object of my invention is to make a camera of this character in which the mask can be easily shifted from the first position in which it passes the secondary image to a second position blocking the secondary image thus permitting the camera to be used in a normal manner with the primary image occupying the entire exposed area of the film without disconnecting the speedometer.

These objects of my invention are achieved in a camera having two optical systems producing a picture by projecting two different images onto different areas of a light-sensitive member, for example ordinary film, through an opening in a wall adjacent to the film, by mounting masking means on this wall adjacent the opening through which light passes to reach the film. This masking means is an apertured member which is mounted upon said wall. The masking means is preferably mounted for movement between a first position in which the member masks a portion of the film with respect to light forming one image and passes through an aperture in the member light forming another image, and a second or retracted position in which the member offers substantially no obstruction to light producing the first image but is in a position to block all light producing the second image. Thus, in the retracted position the mask renders the second optical system inoperative and allows the camera to be used with the principal optical system exposing the entire film frame to a single image in the conventional manner. However, in a broader aspect of my invention the mask may be fixed in the first position when the camera produces only composite pictures. This is entirely satisfactory when the camera is used only as a traffic camera or there is no need to convert to a camera in which the entire frame is exposed to a single image.

It is also to be understood that the invention is not necessarily limited to a camera exposing light-sensitive film but may also be applied to a television camera in which the optical systems project their images onto a photo-sensitive electron tube.

How the above objects and advantages of my invention, as well as others not specifically referred to herein, are attained will be better understood by reference to the following description and to the annexed drawing, in which:

FIG. 1 is a perspective view of the exterior of a complete camera embodying a preferred form of my invention, showing the normal lens and the housing containing the speedometer to be photographed;

FIG. 2 is an elevation of the side of the camera upon which the speedometer housing is mounted but with the speedometer removed;

FIG. 3 is a fragmentary vertical transverse section on line 3—3 of FIG. 2 through the side of the camera and the attachment plate for the speedometer housing;

FIG. 4 is a horizontal section on line 4—4 of FIG. 1;

FIG. 5 is an enlarged fragmentary vertical section on line 5—5 of FIG. 4 showing portions of the two optical systems and the mask mounted on the camera wall;

FIG. 6 is a fragmentary elevation of the film showing the relationship of the exposed areas within one frame;

FIG. 7 is a fragmentary elevation on line 7—7 of FIG. 4 showing the speedometer dial and the stationary cross-hair; and FIG. 8 is a fragmentary section similar to FIG. 5 showing the mask in the retracted position.

Referring now to the drawing, and especially to FIG. 1, there is shown a preferred embodiment of my invention as applied to a camera indicated generally at 10 which may be a motion picture camera of any suitable construction desired. Since the construction and characteristics of a suitable camera may vary widely and constitute no essential portion of the present invention, the camera is shown only in such detail as is necessary to disclose the operation of the present invention and the elements of the camera are shown more or less diagrammatically.

Indicated generally at 12 is a cylindrical housing which encloses the speedometer and a light therefor. Speedometer housing 12 is attached at one end by screws 13 or other suitable means to plate 14 which is one of two plates constituting means for connecting the speedometer housing to the camera. The other of these two plates is indicated at 15 and is attached to the housing of camera 10 in any suitable manner. Plates 14 and 15 are slidably connected together by a dovetail tongue and groove connection. The tongue member 15a of this connection is shown in FIGS. 2 and 3 as being a portion of plate 15. It will be understood that a groove of complementary shape is cut in plate 14 and is adapted to receive the tongue by sliding the plates horizontally with respect to each other.

Plate 14, which is usually vertical, is attached at one edge to base plate 14a which serves as a mounting means for both the camera and speedometer. Plate 14a is ordinarily horizontal and is attached to some part of the automobile, as the instrument panel, in any suitable manner. It will be noted that the camera is mounted on base plate 14a through the two plates 14 and 15 so that the camera can be removed from the automobile leaving the speedometer and base plate in position. Among other advantages, this assures that the camera will be properly oriented when again mounted on plate 14.

Considering again the camera, it is equipped with a suitable system of lenses which project an image upon the light-sensitive film in a well-known manner. This system of lenses is represented diagrammatically by lens 16 of FIG. 5 contained in lens housing 16a. This system of lenses is referred to as the principal or primary optical system since it projects on the light-sensitive film F the principal image which occupies a major portion of the exposed area on the film. The axis 17 of the primary optical system is a straight line substantially perpendicular to film F. The light from lens 16 falls within a cone 17a the boundaries of which are indicated in FIGS. 5 and 8 in broken lines.

In addition to the system 16 of lenses, the camera is provided with a rotating shutter 18 which is driven through bevel gears 19 from any suitable motor, spring or electric. As typical of cameras which may be used for this purpose, the light-senistive film F is indicated as contained within magazine 20 which may be removed as a unit from camera 10. With this construction, one wall of magazine 20 is provided with an opening 21 through which light passes to reach the film F. When the magazine is removed from the camera, this opening is closed by a shutter which is not shown in the drawing as it is well known in the art. When magazine 20 is inserted in the camera 10, the opening 21 is in registration with a similar opening 22 in a wall 23 of the camera. Opening 22 is open at all times.

The speedometer 25 is located within housing 12 which serves not only to enclose the speedometer, but also as a means for mounting the speedometer in a fixed position relative to the camera. The speedometer may be of any suitable design, the details of this instrument not constituting any portion of the invention. The speedometer is driven by a flexible cable 26 in a known manner. Speedometer 25 is provided with shaft 27 on the outer end of which is mounted indicator disc 28 for indicating the vehicle speed, since the angular displacement of shaft 27 and disc 28 from their position of rest bears a known relation to the speed of the vehicle. The face of disc 28 is preferably graduated in miles per hour to permit direct reading of the instrument.

Disc 28 is preferably translucent and is mounted immediately behind an opening 30 in partition 31 which extends transversely across housing 12. Partition 31 is made of metal or other opaque material. Light bulb 32 is located behind disc 28 so that it is illuminated by the light passing through the disc which is projected upon the light-sensitive film to produce a photographic image of the scale on the speedometer disc. Partition 31 is preferably provided with a stationary cross-hair 33, or any other suitable index, that indicates the rest or zero position of disc 28 and thus permits a direct reading of the instrument.

In order to project the image of speedometer dial 28 upon film F, camera 10 is provided with a secondary or auxiliary optical system which is mounted in tube 38. This tube is mounted in the camera by inserting the tube in an opening 39 in plate 15, there being a similar registering opening 41 in plate 14 attached to the speedometer housing 12. The two plates 14 and 15 are held together by means of the tongue and groove connection, with a sufficiently tight fit to exclude any external light from entering the open end of tube 38. The only light admitted is that transmitted from the speedometer housing through opening 41 which is in registration with opening 39 and the open end of tube 38.

When the speedometer housing is detached from the camera, opening 39 is closed by slide 42 mounted in a groove in plate 15. Slide 42 is urged by a spring (not shown) to the closed position shown in FIG. 2. When the speedometer housing is mounted on the camera, it moves to the left in FIG. 2 and engages pin 42a on the slide, thus moving the slide to the dotted line position 42b and uncovering opening 39 as the opening 41 moves into registration therewith.

The secondary optical system consists of a lens 43 having a focal length such that it focuses upon film F the image of disc 28. The light rays after leaving lens 43 pass through prism 44 which reflects the rays through an angle of 90°. As a consequence, the optical axis of the secondary optical system is angular and consists of two sections 45 and 46 disposed at an angle of 90°, or any other suitable angle, to each other. This angular configuration of the secondary optical axis is shown clearly in FIG. 4. In the preferred embodiment, the initial section 45 is perpendicular to optical axis 17 but is spaced at one side (see FIG. 5) thereof, preferably far enough that axis 45 is just outside of the cone 17a of light projected from lens system 16. Since axes 45 and 17 are perpendicular to each other, prism 44 is a right angle prism to direct the light from it to the desired location on film F. As may be seen by reference to FIG. 4, the second section 46 of this optical axis and primary axis 17 lie in a common plane which is the plane of FIG. 5. This second section 46 of the secondary optical axis is inclined with respect to the primary optical axis so that the two axes converge towards one another in the direction of film F, as shown in FIG. 5. This is accomplished by slightly rotating prism 44 about axis 45 away from the perpendicular to the principal optical axis.

The angular nature of the secondary optical axis makes it possible to locate the speedometer at one side of camera 10. This is a much preferable arrangement instead of placing the speedometer in front of the camera, because the camera can be placed close to the windshield and drive cable 26 is not in the way of occupants of the automobile.

As illustrated clearly in FIG. 5, optical axis 46 is not perpendicular to film F. However, it is still possible to obtain a sharp definition of image 50 of the speedometer on the film because of the short focal length of lens 43, and the closeness of speedometer dial 48 to the lens. Of course it is desirable that the deviation of axis 46 from a perpendicular to the film should be small. In order to reduce this deviation to a minimum, prism 44 is located as close as possible to the cone 17a of light from lens 16 forming the primary image on the film. Ideally, the prism is located outside the boundary of this cone of light, but a slight projection of the prism into the cone may not be particularly objectionable.

If the image of the speedometer is not sufficiently sharp at the film, it is possible to correct for this lack of focus. This can be done by tilting the speedometer dial about an axis, which would be a horizontal axis when the dial is viewed as in FIG. 7, so that the edge of the dial being photographed is moved closer to the lens than the remaining portion of the dial. This tilting of the dial is in a direction to compensate for the inclination of the film relative to axis 46 as will be understood by those skilled in the art.

The invention is not limited to axes 17 and 46 being coplanar. This relation is preferred to place the image 50 of the speedometer on the center line of the frame on the film. If image 50 is shifted right or left to a corner position, as viewed in FIG. 6, the axes 17 and 46 are no longer co-planar but are still convergent toward the film.

Mask 52 is provided in order to mask a portion of the film from light projected by a lens system 16 and thus leave an area on the film to receive the image 50 of the speedometer. This mask is preferably made of metal, although any opaque material is satisfactory. It is mounted on wall 23 at one side of opening 22 in a position such that a portion of the mask extends beyond one edge of opening 22 as shown in FIG. 5. Mask 52 is provided with an aperture 53 extending through the mask in order to pass light projected from prism 44 to form the image 50 on the film. The axis of aperture 53 is preferably inclined to optical axis 17 and is parallel to optical axis 46, or substantially so.

In a preferred embodiment of my invention, the means for mounting mask 52 on the camera wall 23 is such that the mask may be moved between a first or advanced position as shown in FIG. 5, in which the mask blocks off a portion of the film from light projected by the primary lens system 16, and a second or retracted position as shown in FIG. 8 in which the mask is at one side of and substantially removed from the cone of light projected by a lens system 16. Movement of the mask is effected manually by means of stem 55 which projects through the wall of the camera, as may be seen in FIG. 2. However, it will be evident without further illustration that the mask may be attached to wall 23, or any other part of the camera for that matter, in a fixed position corresponding to that shown in FIG. 5. The mask is then always operational and cannot be moved to the retracted or inoperative position of FIG. 8.

The normal or advanced position of the mask is illustrated in FIG. 5. In this position the mask projects beyond the edge of opening 22 to block off an area on film 22 from light projected through lens system 16. Viewed from the front the outline of the mask is preferably arcuate because it conforms to the shape of the image 50 of the speedometer. In this advanced position, all of aperture 53 in the mask registers with opening 22. Thus light projected by prism 44 can pass through aperture 53 and a portion of opening 52 to project an image of the speedometer onto film F. In practice only half or less of the speedometer dial is shown in image 50. Because the mask is at one edge of opening 22, the angle of the axis of aperture 53 is such that the aperture does not pass any of the light originating with lens system 16. The shadow cast on the film by the mask with respect to light from the primary optical system is preferably at least equal to, or it may be slightly larger than the area exposed to light from the secondary optical system. If the latter, the image of the speedometer is separated from the remainder of the exposed area on the film by a narrow black border at 56.

Movement of the mask to the retracted position of FIG. 8 causes one end of aperture 53 to be fully covered by wall 23 so that no light projected by prism 44 can pass through the aperture. The mask in this position operates to block all light from the prism so that no part of the second image appears on the film. Hence by merely shifting the mask the camera can be used to record only the primary image using the full area of each film frame without deactivating the speedometer or removing the camera from its mount.

The effectiveness of the mask to block light from the prism is improved by extending the mask as far as possible in the direction of axis 17 to form projection 57 at the side of the mask removed from opening 22. By making the axial profile of the mask highest at the edge which is nearest the prism, the mask is most effective to block off light from the prism with minimum interference to light from lens 16, as may be seen in FIG. 8. Also the surface of the mask near light cone 17a can be so shaped as to eliminate reflection of light from lens 16 onto the film. The re-entrant shape shown eliminates any undesired reflection that occurs if the end surface of the mask is parallel, or nearly so, to the ray of light in cone 17a. In its retracted position the mask is substantially removed from the cone of light rays projected by lens 16, and offers little or no obstruction to light from the primary optical system which forms the primary image on the film F.

The present invention is not limited to use in a motion picture camera nor to use in a camera using light-sensitive film or the like. It may be used with a television camera in which the optical systems project separate images on an electron tube, the ultimate record being made on magnetic tape. Accordingly the term light-sensitive member is used herein to include broadly film, electron tubes, or any other light-sensitive device onto which the images may be projected.

From the foregoing description it will be evident that various changes in the construction, relative positions and arrangements of parts may be made without departing from the spirit and scope of my invention. Accordingly it is to be understood that the above disclosure is considered to be illustrative of rather than limitative upon the appended claims.

I claim:

1. A motion-picture type camera, the combination comprising:
   a light sensitive film.
   a primary optical system and a secondary optical system occupying fixed positions within the camera and relative to the position of the film with both systems simultaneously projecting separate images toward the film to produce thereon a composite image;
   and apertured masking means movably mounted within the camera near the film and movable between a first position in which said means projects into the light from the primary optical system to mask a portion of the image therefrom and passes light from the secondary system whereby light from the two separate systems simultaneously reaches the film to produce a composite picture;
   and a second position in which said means blocks the light from the secondary system and presents substantially no obstacle to light from the first system.

2. In a camera producing a composite picture by projecting two different images on a light-sensitive film, the combination comprising: wall means adjacent the film and having an opening through which light from two spaced sources passes to reach the film and produce both images;

an opaque member normally located at said opening in a first position to mask a portion of the film with respect to light from one of said sources forming a first image and having an aperture to pass through said aperture light from the other of said sources forming a second image, the axis of said aperture being inclined with respect to the axis of said opening;

and means slidably mounting the apertured member on said wall means for linear movement in a direction substantially perpendicular to the axis of said opening between said first position and a retracted position in which the member intercepts all light producing said second image and presents substantially no obstruction to light producing the first image.

3. In a camera producing a composite picture by projecting two different images on a light-sensitive film, the combination comprising:

wall means adjacent to the film and having an opening through which light passes to reach the film and produce both images;

and opaque mask movably mounted on said walls to move parallel to the plane of said opening, said mask having an aperture extending therethrough with the axis of the aperture inclined to a perpendicular to said plane and converging toward the film with the central axis of the opening in the wall, said mask being movable between an advanced position in which light directed substantially parallel to the aperture of the axis passes through the mask to reach the film and a retracted position in which the mask intercepts all said light and prevents it from reaching the film.

4. The combination recited in claim 3 in which the axial profile of the portion mask projecting beyond the edge of the wall opening is highest at the side of the mask remote from the wall.

5. In a camera simultaneously projecting two different images onto a single light-sensitive film to produce a composite picture, the combination comprising:

wall means adjacent the film and having an opening through which light passes to reach the film;

a first optical system having its axis substantially perpendicular to the plane of said opening and projecting an image large enough to cover said opening;

a second optical system including a prism receiving light along a second axis substantially perpendicular to and spaced from the first mentioned axis and projecting light onto the film along a third axis angularly disposed with respect to both the second axis and the third axis;

a mask of opaque material normally located at said opening in a position to mask a portion of the film from light projected from the first optical system and provided with an aperture transmitting to said masked portion of the film light projected by said second optical system; and means mounting the mask for movement between said normal position and a retracted position in which the mask presents substantially no obstruction to light from the first optical system but masks the film from light from the second optical system.

6. The structure of claim 5 in which the first and third axes converge toward the film and the mask projects inwardly of the opening in said wall means for one edge of the opening.

7. The structure of claim 5 in which the prism of the second optical system is located outside the cone of light projected by the first optical system and is inclined from the perpendicular with respect to the first axis to direct light emerging from the prism along an axis coplanar and convergent with the first axis.

8. In a camera simultaneously projecting two different images onto a single light sensitive film to produce a composite picture, the combination comprising:

wall means adjacent the film and having an opening through which light passes to reach the film;

a first optical system having its axis substantially perpendicular to said opening and projecting an image large enough to cover all the film exposed through said opening;

a second optical system including a prism receiving light along a second axis substantially perpendicular to and spaced from the first mentioned axis and projecting light onto the film along a third axis angularly disposed with respect to the second axis and the third axis;

a mask of opaque material movably mounted on said wall at said opening therein;

said mask having an aperture therethrough, the mask being movable between a first position in which the axis of the aperture coincides with said third optical axis to pass light from the second optical system to the film while blocking light from the first optical system, and a second position in which the aperture is closed by said wall and the mask blocks light from the second optical system but is substantially outside the cone of light from the first optical system.

9. The combination as recited in claim 8 in which the axial profile of the portion of the mask projecting into said wall opening is closest to the axis of the aperture at the side of the mask removed from the opening.

References Cited in the file of this patent
UNITED STATES PATENTS

| | | |
|---|---|---|
| 1,475,006 | Faber | Nov. 20, 1923 |
| 2,210,610 | White | Aug. 6, 1940 |
| 2,273,876 | Lutz et al. | Feb. 24, 1942 |
| 2,721,497 | Warren | Oct. 25, 1955 |
| 2,821,106 | Ranft et al. | Jan. 28, 1958 |
| 2,891,439 | Lee | June 23, 1959 |